US008203729B2

(12) United States Patent
Miyake et al.

(10) Patent No.: US 8,203,729 B2
(45) Date of Patent: Jun. 19, 2012

(54) IMAGE FORMING APPARATUS PROVIDING USER SUPPORT IN SLEEP MODE

(75) Inventors: Kouji Miyake, Yamatokoriyama (JP); Shuhji Fujii, Kizugawa (JP); Shinji Kato, Osaka (JP); Tsutomu Yoshimoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 682 days.

(21) Appl. No.: 12/379,353

(22) Filed: Feb. 19, 2009

(65) Prior Publication Data

US 2009/0262379 A1 Oct. 22, 2009

(30) Foreign Application Priority Data

Mar. 3, 2008 (JP) ................................ 2008-051826

(51) Int. Cl.
*G06F 15/00* (2006.01)
*G06F 15/16* (2006.01)

(52) U.S. Cl. ...................................... 358/1.14; 709/217

(58) Field of Classification Search .................. 358/1.14
See application file for complete search history.

(56) References Cited

U.S. PATENT DOCUMENTS

| | | | | |
|---|---|---|---|---|
| 6,738,157 | B1 | 5/2004 | Hirose | |
| 6,750,878 | B1 | 6/2004 | Tatsuo et al. | |
| 6,978,284 | B2 | 12/2005 | McBrearty et al. | |
| 2003/0072582 | A1 | 4/2003 | Oyaide | |
| 2004/0078724 | A1 | 4/2004 | Keller et al. | |
| 2004/0139385 | A1 | 7/2004 | Sakaue | |
| 2005/0237569 | A1 | 10/2005 | Takahashi | |
| 2002/0033960 | A1 | 11/2005 | Kuroyanagi | |
| 2005/0248807 | A1* | 11/2005 | Kuroyanagi | 358/1.15 |
| 2006/0007469 | A1 | 1/2006 | Uruma | |
| 2006/0018628 | A1 | 1/2006 | Mizuno et al. | |
| 2006/0045544 | A1 | 3/2006 | Kim et al. | |
| 2007/0220359 | A1 | 9/2007 | Mochizuki | |
| 2008/0089709 | A1 | 4/2008 | Higashi | |
| 2008/0144070 | A1* | 6/2008 | Mori et al. | 358/1.13 |
| 2008/0260416 | A1 | 10/2008 | Nosaki | |
| 2009/0225348 | A1 | 9/2009 | Miyake et al. | |
| 2009/0225357 | A1 | 9/2009 | Miyake et al. | |
| 2009/0237701 | A1 | 9/2009 | Ishikura et al. | |
| 2009/0248752 | A1 | 10/2009 | Miyake et al. | |

FOREIGN PATENT DOCUMENTS

| | | | |
|---|---|---|---|
| CN | 101030069 | A | 9/2007 |
| JP | 6-261166 | | 9/1994 |
| JP | 2001-016388 | A | 1/2001 |
| JP | 2001-018501 | | 1/2001 |
| JP | 2002-111940 | A | 4/2002 |
| JP | 2003-110763 | | 4/2003 |
| JP | 2003-209718 | | 7/2003 |
| JP | 2006-20263 | | 1/2006 |
| JP | 2006-021501 | A | 1/2006 |
| JP | 2006-139145 | | 6/2006 |

(Continued)

*Primary Examiner* — Saeid Ebrahimi Dehkordy
(74) *Attorney, Agent, or Firm* — Edwards Wildman Palmer LLP; David G. Conlin; David A. Tucker

(57) ABSTRACT

An image forming apparatus that can support the user in sleep mode is provided. When the apparatus enters sleep mode, guidance information is displayed on an electronic paper. The electronic paper maintains displayed contents even when power is not supplied and, therefore, even when power is not supplied to a display panel in the sleep mode, the display for the user is continuously given, thereby supporting the user.

8 Claims, 11 Drawing Sheets

FOREIGN PATENT DOCUMENTS

| | | |
|---|---|---|
| JP | 2006-201460 | 8/2006 |
| JP | 2007-331121 | 12/2007 |
| JP | 2008-149602 | 7/2008 |

* cited by examiner

IMAGE FORMING APPARATUS PROVIDING USER SUPPORT IN SLEEP MODE

CROSS-REFERENCE TO RELATED APPLICATION

This nonprovisional application claims priority under 35 U.S.C. §119 (a) on Patent Application No. 2008-051826 filed in Japan on Mar. 3, 2008, the entire contents of which are hereby incorporated by reference.

BACKGROUND OF THE INVENTION

1. Field of the Invention

The present invention relates to an image forming apparatus that displays guidance information related to an operation of the apparatus for supporting a user, in a sleep mode (hereinafter also referred to as "power saving mode").

2. Description of the Background Art

Electronic paper is a thin display technology similar to a liquid crystal display and the like. The electronic paper is characterized in that it has similar appearance as ordinary paper, that displayed contents are electrically rewritable, and that power consumption thereof is very low as electric power is unnecessary to retain the displayed contents. Further, electronic paper is non-volatile, that is, once the displayed contents are rewritten, the displayed contents are maintained even when power is turned off. Attempts to apply electronic paper as such have been made in various technical fields.

By way of example, Japanese Patent Laying-Open No. 2003-209718 (hereinafter denoted as "'718 application") proposes a technique of utilizing electronic paper in a digital camera. According to the technique disclosed in '718 application, when a power button is pressed by a user while the power is on, remaining battery level is calculated, and the maximum number of pictures that can be taken is calculated from available memory space. These pieces of calculated information are output to electronic paper, and on the electronic paper, information related to the remaining battery level and the maximum number of pictures that can be taken at present is displayed. Even when the power of digital camera is turned off thereafter, the displayed contents of information related to the remaining battery level and the maximum number of pictures that can be taken before power-off are maintained.

Further, Japanese Patent Laying-Open No. 2006-201460 (hereinafter denoted as "'460 application") proposes a technique of utilizing electronic paper in an image forming apparatus such as a multifunctional printer. According to the technique disclosed in '460 application, information related to image formation, such as counter information and information of supplies, is displayed on electronic paper. This allows collection of necessary pieces of information without turning on the power.

Recently, in consideration of global environment including global warming, a large number of devices that make transition to sleep mode to limit power consumption comes to be heavily marketed. Such trend is also felt in the field of image forming apparatuses including multifunctional peripherals.

In designing an image forming apparatus, guidance information for supporting a user may be displayed, by maintaining the contents that have been displayed on the display device on electronic paper, when the display device goes dark in sleep mode.

Though it is possible by the techniques described in '718 and '460 applications to transmit necessary information to the user or service person even when power is off by displaying information before power off on the electronic paper, the idea described above cannot be realized. Specifically, the techniques described in '718 and '460 applications cannot directly be adopted to realize the idea described above.

SUMMARY OF THE INVENTION

The present invention was made in view of the foregoing, and its object is to provide an image forming apparatus capable of supporting the user even in the sleep mode.

According to an aspect, the present invention provides an image forming apparatus capable of making a transition to a sleep mode in which power consumption is limited, including: a first display unit displaying a state of the apparatus during the time of power conduction; a second display unit maintaining displayed contents during the time of non-power-conduction; and a first control circuit causing guidance information to be displayed on the second display unit, when there is a transition to the sleep mode.

In the arrangement described above, the second display unit maintains the displayed contents even in a state of non-power-conduction. Therefore, even when power is not supplied to the first display unit in the sleep mode, it is possible to continuously provide display to the user. Therefore, method of transition from sleep mode to operation mode, reservation status of transmission jobs, storage status of confidential data, as well as information related to image formation including remaining amount of toner and paper can be displayed as guidance information, for supporting the user. Even when transition to the normal operation mode of the apparatus does not take place, it is possible for the user to grasp the state of the apparatus and to know the method of transition from the sleep mode to the operation mode. Therefore, improved function of user interface can be attained without wasting power.

Preferably, the second display unit is a non-volatile display device.

In the arrangement above, even when the second display unit is in a non-power-conduction state, displayed contents thereof can be maintained and, therefore, even when operation of the apparatus is suspended, display to the user can be maintained continuously. Therefore, necessary message can be delivered to the user without wasting power.

An example of the "non-volatile display device" may include electronic paper.

More preferably, the second display unit also serves as the first display unit.

This enables display both during the time of power conduction and during the time of non-power-conduction without increasing cost of the apparatus, and it is unnecessary for the user to see a plurality of displays. Therefore, interface with the user is not degraded.

More preferably, the first control circuit causes the second display unit to display a standard screen of the apparatus related to image formation, as the guidance information.

In the arrangement above, the standard screen is displayed and, therefore, it is possible to determine status of attachment of optional devices that is hard to determine from appearance such as a finisher and LCC (Large Capacity Cabinet), as well as the amount of remaining recording paper and toner replenishment. Accordingly, the user can determine whether or not desired copying operation is possible, without necessitating transition to the operation mode. As a result, better function of user interface can be attained, and wasteful power consumption can be avoided.

As the "standard screen", an image allowing copying operation, for example, may be used.

More preferably, the first control circuit causes the second display unit to display, as the guidance information, information representing transition procedure from the sleep mode to an operation mode.

Here, as the procedure for transition to the operation mode is displayed, a user not familiar with the procedure can be well supported.

More preferably, the first control circuit causes the second display unit to display, as the guidance information, reservation information of transmission data.

Here, it is possible to confirm reservation status of transmission data without necessitating transition to the operation mode and, therefore, better function of user interface can be attained, and wasteful power consumption can be reduced.

More preferably, the first control circuit causes the second display unit to display, as the guidance information, storage information of received data.

Here, it is possible to confirm reception status of confidential data without necessitating transition to the operation mode and, therefore, better function of user interface can be attained, and wasteful power consumption can be reduced.

More preferably, the image forming apparatus further includes a second control circuit causing the second display unit to display the displayed contents in enhanced manner to better appeal to the user.

By the arrangement above, it is possible for the user to understand, by simply taking one look at the contents displayed on the second display unit, which state the image forming apparatus is in.

Examples of the manner of "emphasized display" may include display of the paper empty portion in highlight or in enlargement, or elimination of other displays to leave display of only a necessary message.

More preferably, the image forming apparatus further includes a third control circuit causing the second display unit to continue display of the guidance information even after power conduction is resumed.

By the arrangement above, it becomes possible to support the user using guidance information continuously displayed on the second display unit, when power conduction is resumed.

According to the present invention, by the user support provided in the sleep mode, it becomes possible to grasp the state of apparatus even when the apparatus does not make a transition to the normal operation mode and, in addition, it is possible to notify the user of the method of transition from the sleep mode to the operation mode. Therefore, an image forming apparatus realizing better function of user interface without wasting power can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Overall Configuration of Image Forming Apparatus 20

Figure 1:
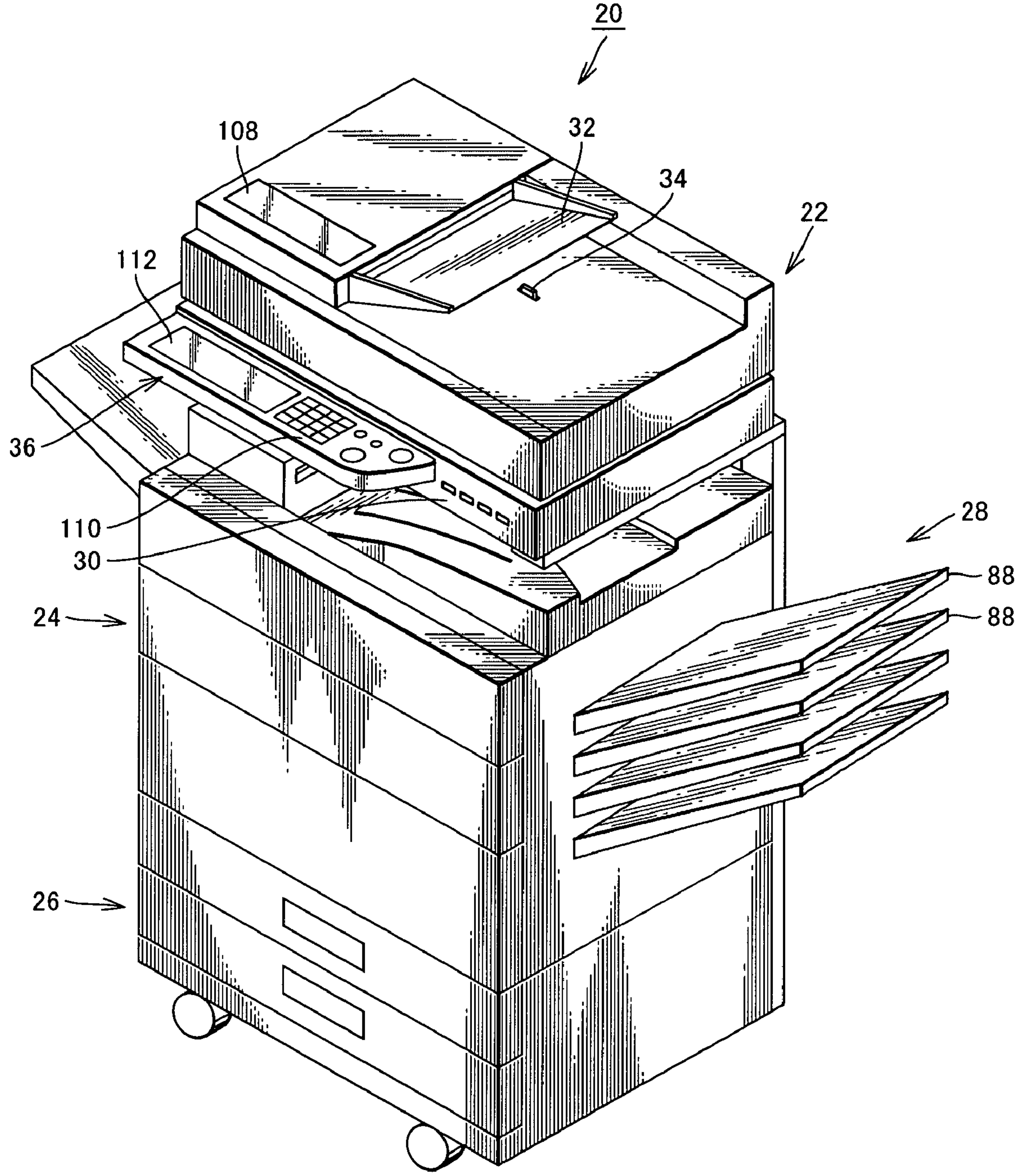
FIG. 1 is a perspective view showing an outer appearance of an image forming apparatus in accordance with an embodiment of the present invention.
Figure 2:
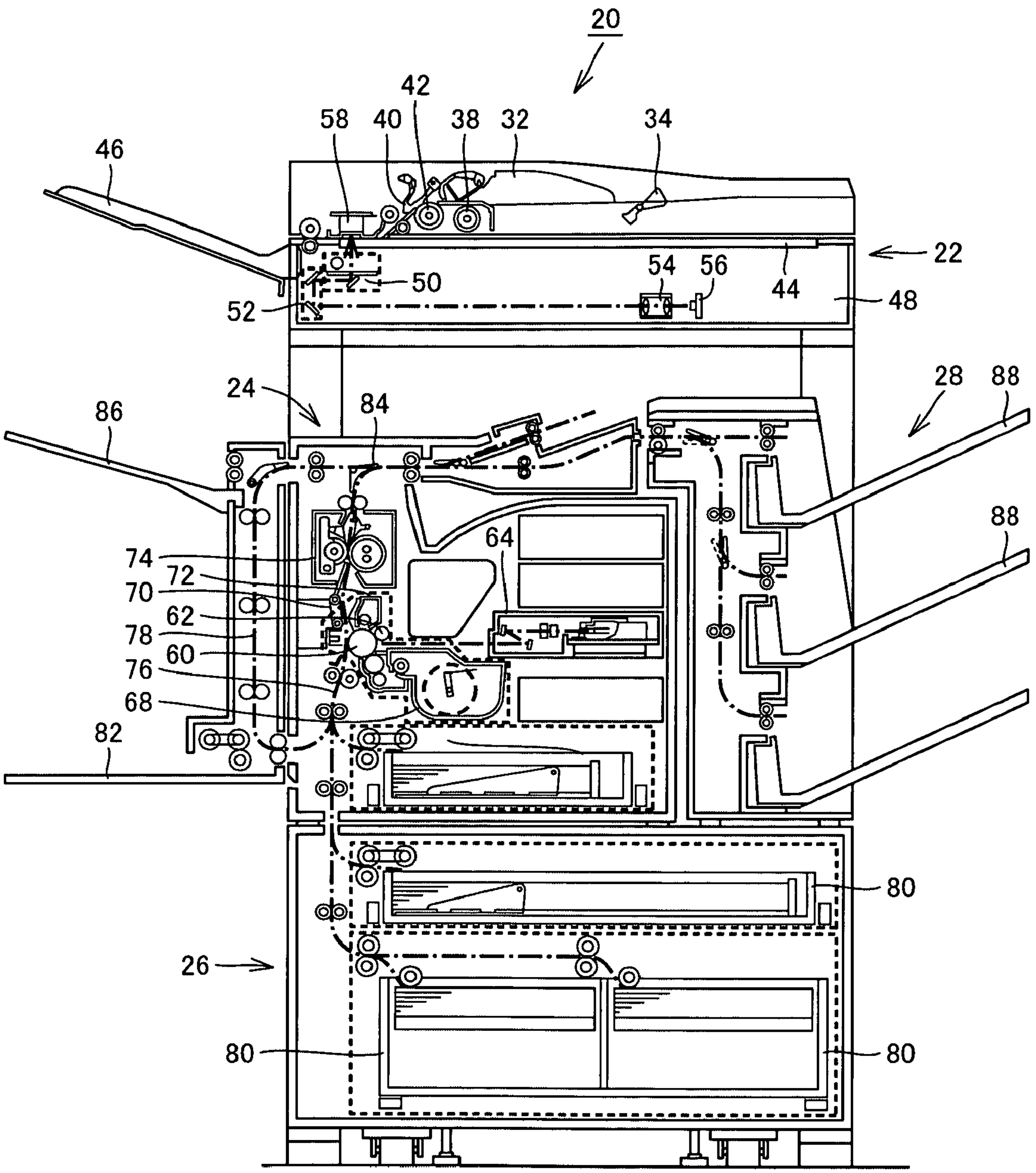
FIG. 2 schematically shows an internal configuration of the image forming apparatus.

Referring to FIGS. 1 and 2, an image forming apparatus 20 in accordance with the present embodiment is a digital multifunctional printer. Image forming apparatus 20 is capable of operating selectively in, for example, a copy mode in which an image of a document is read and printed on a sheet of printing paper, a facsimile mode in which an image of a document is read and transmitted and an image of a document is received and printed on a sheet of printing paper, and a printer mode in which an image received through a network from an information terminal, not shown, is printed on a sheet of printing paper.

Image forming apparatus 20 includes a document feeding and reading unit 22, an image forming unit 24, a paper feeding unit 26, a post processing device 28, and a USB (Universal Serial Bus) interface 30.

Internal configuration of image forming apparatus 20 will be described taking an operation in the copy mode as an example.

When a user sets a document on a document set tray 32 of document feeding and reading unit 22 of image forming apparatus 20, first, a document detection sensor 34 detects that the document has been set. The user operates operating unit 36 of document feeding and reading unit 22, to input and set size of printing paper, magnification and the like. After the input and setting, an instruction to start copying is given in accordance with the contents of operation on operating unit 36.

In response to an operation of operating unit 36, document feeding and reading unit 22 draws the document on document set tray 32 one by one, by pick-up roller 38. Document feeding and reading unit 22 feeds the drawn document to a platen glass 44 through a separation plate 40 and a feed roller 42, feeds the document in a sub-scanning direction on platen glass 44, and discharges the document to a document discharge tray 46.

At this time, a surface (lower surface) of the document is read by a first reading unit 48. Specifically, the first reading unit 48 first moves and positions a first scanning unit 50 to a prescribed position, and positions a second scanning unit 52 at a prescribed position. Thereafter, the first reading unit 48 irradiates the document surface through platen glass 44 with an exposure lamp of first scanning unit 50, and guides light reflected from the document to an imaging lens 54 through reflection mirrors of first and second scanning units 50 and 52. The light reflected from the document is collected by imaging lens 54 to a CCD (Charge Coupled Device) 56, and the image on the document surface is formed on CCD 56, whereby the image on the document surface is read.

Further, a rear surface (upper surface) of the document is read by the second reading unit 58. The second reading unit 58 is arranged above platen glass 44. The second reading unit 58 includes an exposure lamp, formed of an LED (Light Emitting Diode) array, a fluorescent lamp and the like, irradiating the rear surface of document, a SELFOC (registered trademark) lens array collecting light reflected from the document pixel by pixel, and a contact image sensor (CIS) performing photo-electric conversion of the light reflected from the document received through SELFOC lens array and outputting an analog image signal.

When the user opens an upper part of document feeding and reading unit 22 and places a document on platen glass 44, the first reading unit 48 can read the document surface in this state. In this case, the first reading unit 48 moves the first and second scanning units 50 and 52 in the sub-scanning direction while maintaining a prescribed speed relation to each other, whereby the document on platen glass 44 is exposed by the first scanning unit 50 and the light reflected from the document is guided by the first and second scanning units 50 and 52 to imaging lens 54. The document image is formed on CCD 56 by the imaging lens 54.

Figure 3:
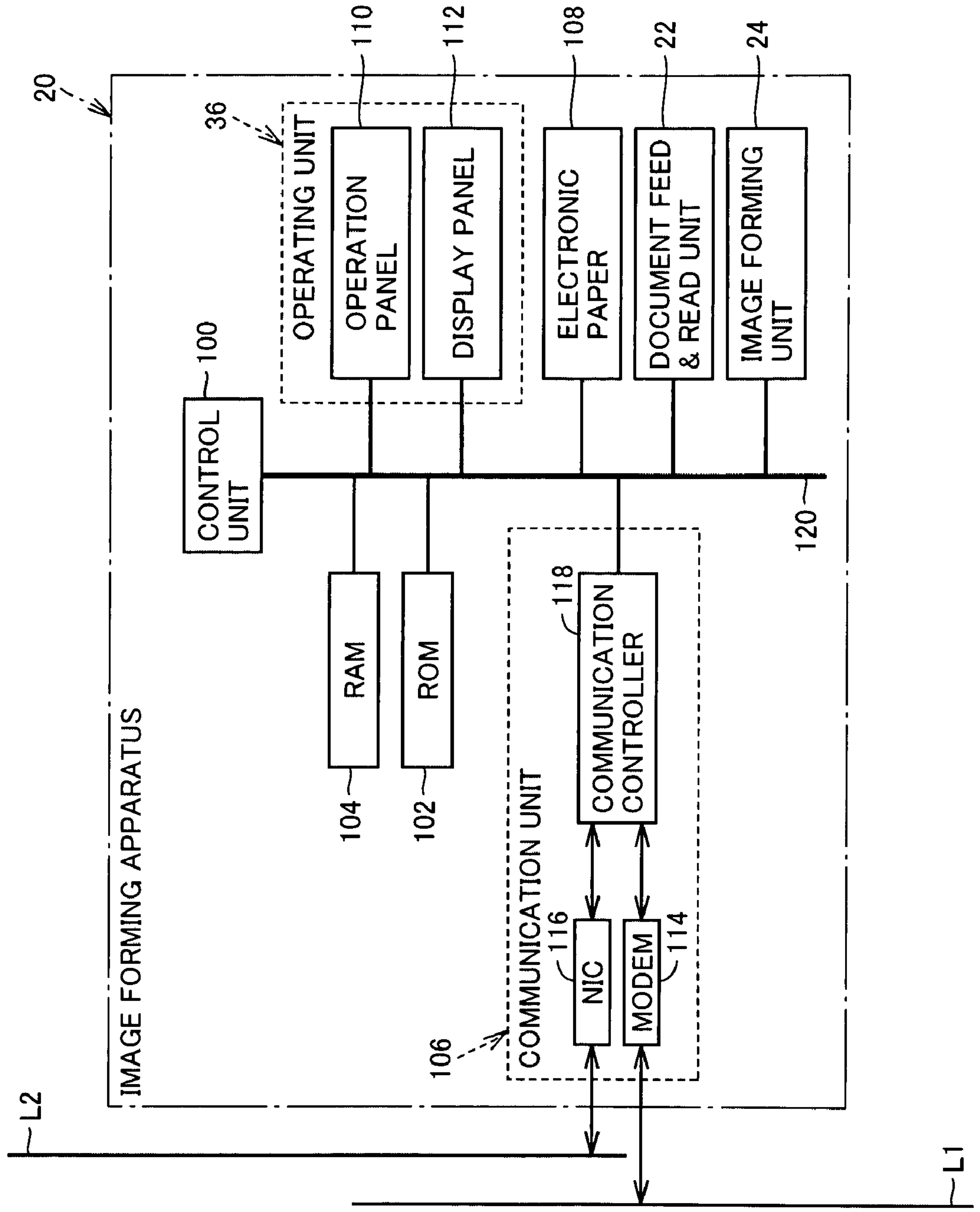
FIG. 3 is a block diagram showing hardware configuration of the image forming apparatus.

When image or images on one or both surfaces of the document are read in the above-described manner, image data representing the image or images on one or both surfaces of the document is input to a control unit 100 implemented, for example, by a micro-computer shown in FIG. 3. In control unit 100, the image data is subjected to various types of image processing and output to image forming unit 24.

Image forming unit 24 prints the document image on a sheet of recording paper based on the image data. Image forming unit 24 includes a photoreceptor drum 60, a charger 62, a laser scanning unit (hereinafter denoted as "LSU") 64, a developer 68, a transfer device 70, a cleaning device 72, a fixing device 74, a neutralizer, not shown, and the like.

Further, image forming unit 24 is provided with a main feeding path 76 and a reverse feeding path 78. A sheet of recording paper fed from paper feeding unit 26 is fed along main feeding path 76. Paper feeding unit 26 draws sheets of recording paper contained in paper cassette 80 or placed on a manual feed tray 82 one by one, and feeds the drawn sheet of recording paper to main feeding path 76 of image forming unit 24.

While the sheet of paper is fed along main feeding path 76 of image forming unit 24, that is, while the sheet of paper passes between photoreceptor drum 60 and transfer device 70 and further through fixing device 74, printing is done on the sheet of recording paper.

Photoreceptor drum 60 rotates in one direction. The surface of photoreceptor drum 60 is cleaned by cleaning device 72 and the neutralizer, and then uniformly charged by charger 62.

LSU 64 modulates laser beam based on the image data output from document feeding and reading unit 22, and repeatedly scans the surface of photoreceptor drum 60 with the laser beam in the main scanning direction, whereby an electrostatic latent image is formed on the surface of photoreceptor drum 60.

Developer 68 develops the electrostatic latent image by supplying toner to the surface of photoreceptor drum 60, and forms a toner image on the surface of photoreceptor drum 60.

Transfer device 70 transfers the toner image on the surface of photoreceptor drum 60, to the sheet of recording paper passing through transfer device 70 and photoreceptor drum 60.

Fixing device 74 fixes the toner image on the sheet of recording paper, by applying heat and pressure to the sheet of recording paper.

At a connecting position between main feeding path 76 and reverse feeding path 78, a branching pawl 84 is provided. When printing is to be done only on one side of the sheet of recording paper, branching pawl 84 is positioned such that the sheet of recording paper fed from fixing device 74 is guided by branching pawl 84 to discharge tray 86 or to a post processing device 28.

When printing is to be done on both surfaces of the sheet of recording paper, branching pawl 84 is turned in a prescribed direction so that the sheet of recording paper is guided to reverse feeding path 78. The sheet of recording paper is turned over as it passes through reverse feeding path 78, and then it is again fed to the main feeding path 76. Thereafter, as the sheet of recording paper is again fed along the main feeding path 76, printing is done on the rear surface, and the sheet is guided to discharge tray 86 or post processing device 28.

The sheet of recording paper on which printing has been done as described above is guided to discharge tray 86 or post processing device 28, and discharged to discharge tray 86 or to any of discharge trays 88 of post processing device 28.

Post processing device 28 is for performing processes of sorting and discharging a plurality of sheets of recording paper to discharge trays 88, punching each sheet of recording paper, and stapling the sheets of paper. By way of example, when a number of printed copies are to be prepared, post processing device 28 sorts and discharges sheets of recording paper to discharge trays 88 such that sorted sets of copies are allotted one by one, and each set of sheets on each discharge tray 88 is punched or stapled, whereby printed copies are provided.

<Hardware Configuration of Image Forming Apparatus 20>

Referring to FIG. 3, image forming apparatus 20 includes document feeding and reading unit 22 capable of reading document image, image forming unit 24 providing printed output by forming an image read by document feeding and reading unit 22 on a sheet of paper with the image color reproduced by electro-photographic process, operating unit 36 allowing settings of various functions related to the image forming process, and, in addition, a control unit 100, an ROM (Read Only Memory) 102, an RAM (Random Access Memory) 104, a communication unit 106 and an electronic paper 108.

Operating unit 36 includes an operation panel 110 and a display panel 112. Appearances of operation panel 110 and display panel 112 will be described later.

Control unit 100 is in charge of overall control of image forming apparatus 20. Control unit 100 is implemented by a CPU (Central Processing Unit) or the like.

ROM 102 stores a program, data and the like necessary for controlling an operation of image forming apparatus 20. Control unit 100 controls image forming apparatus 20 in accordance with the program and data stored in ROM 102, and executes control related to various functions of image forming apparatus 20.

RAM 104 has a function of a working memory temporarily storing results of operations and processes performed by control unit 100, a function of a back-up memory storing count value, jam and service error history information, information of supplies and the like and a function of a frame memory storing image data.

Communication unit 106 includes a modem 114, an NIC (Network Interface Card) 116 and a communication controller 118. Modem 114 provides an interface with telephone line L1 connected to a facsimile device, not shown. NIC 116 provides an interface with an LAN (Local Area Network) line L2 connected to an information terminal such as a computer, not shown. Communication controller 118 controls operations of modem 114 and NIC 116.

Electronic paper 108 is a non-volatile display member, and contents displayed thereon can be maintained continuously even when power supply to display panel 112 is stopped. Specifically, electronic paper 108 serves as an auxiliary display unit to display panel 112. As shown in FIG. 1, electronic paper 108 is attached to a top plate of document feeding and reading unit 22.

Document feeding and reading unit 22, image forming unit 24, ROM 102, RAM 104, operation panel 110 and display panel 112 of operating unit 36, communication controller 118 of communication unit 106 and electronic paper 108 described above are connected to a bus 120 extending from control unit 100. Therefore, document feeding and reading unit 22, image forming unit 24, ROM 102, RAM 104, operation panel 110 and display panel 112 of operating unit 36, communication controller 118 of communication unit 106 and electronic paper 108 are controlled by control unit 100.

Particularly, in the present embodiment, control unit 100 performs power conduction control using a driving power source, not shown, on document feeding and reading unit 22, image forming unit 24, operating unit 36, communication unit 106 and electronic paper 108 described above, at the time of transition from normal operation mode to sleep mode in which power consumption is limited, and from sleep mode to normal operation mode.

Further, control unit 100 and communication controller 118 of communication unit 106 form display data based on data stored in RAM 104 and the like, respectively, and control electronic paper 108 such that the display data is displayed thereon.

<Appearance of Operating Unit 36>

Figure 4:
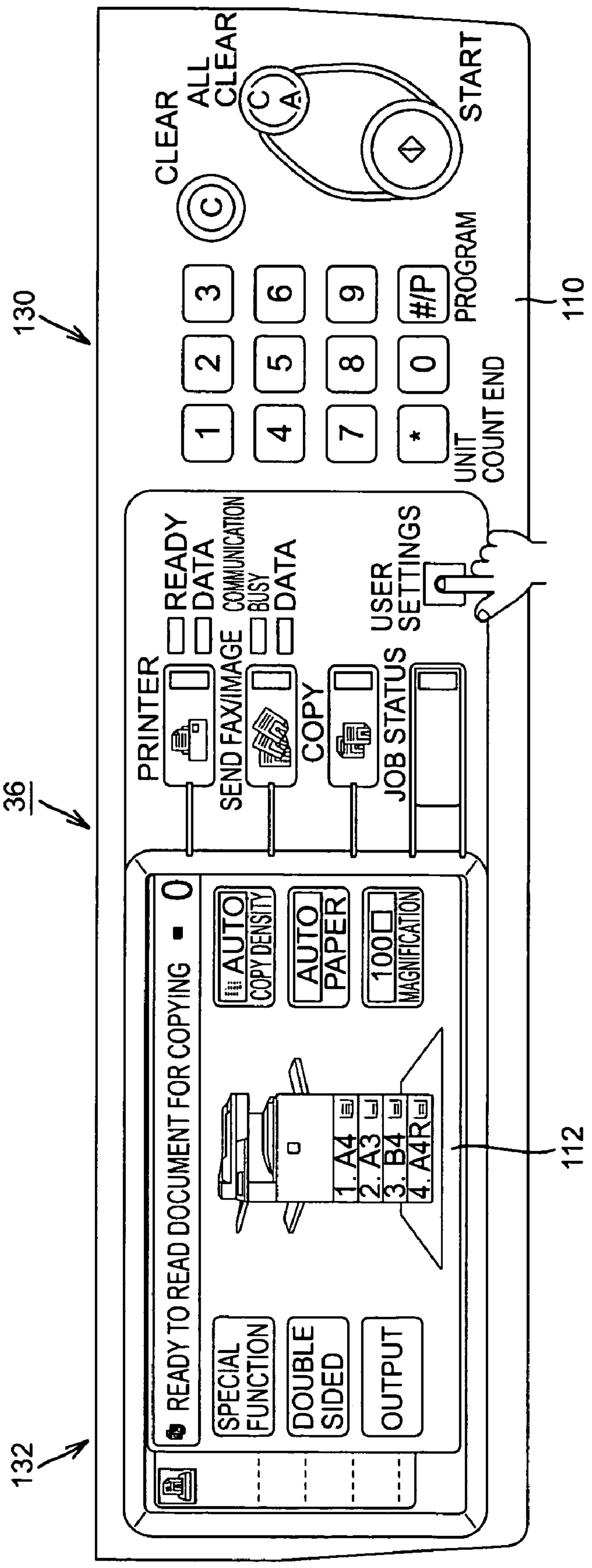
FIG. 4 is a plan view showing an appearance of an operating unit.

Referring to FIG. 4, operating unit 36 is formed by integrating operation panel 110 and display panel 112. Operating unit 36 is divided into two areas 130 and 132.

Specifically, operation panel 110 is placed on the right area 130 of operating unit 36. On operation panel 110, ten keys and various other operation buttons are provided. On the other hand, display panel 112 is arranged from the center to the left area 132 of operating unit 36. Display panel 112 is formed of a small, touch-panel integrated type liquid crystal display.

The user can confirm the state of image forming apparatus 20, job processing status, and the like, by looking at the display on display panel 112 of operating unit 36. Further, it is possible for the user to set functions and to instruct an operation of image forming apparatus 20 and the like, by selecting, on the touch panel superposed on the display area, a select button displayed on the display area of liquid crystal display of display panel 112.

<Operation>

Though not specifically shown, in image forming apparatus 20, error detecting units are provided for detecting malfunction of image forming apparatus 20, each implemented, for example, by a sensor, at document feeding and reading unit 22, image forming unit 24, main feeding path 76, reverse feeding path 78 and the like. If an error is detected by the error detecting unit, a notice that operation of the apparatus is suspended, is given to the user, on display panel 112. Further, display panel 112 provides messages such as toner empty, stapler empty, change photoreceptor drum, change developer, need maintenance, waste toner full, paper empty (including size and location), unsuccessful fixing, defect in optical system, hard disk error and LCC error, giving alarm about the status to the user.

Electronic paper 108 is biased and, therefore, media particles forming the surface of electronic paper 108 move physically (electrophoresis), whereby various pieces of guidance information mentioned above are displayed on electronic paper 108.

At this time, when there is a transition from the normal operation mode to the sleep mode and power supply is stopped, guidance information on display panel 112 disappears, while the moved particles (that went under electrophoresis) remain in that state. As a result, displayed contents on electronic paper 108 can be maintained.

Figure 5:
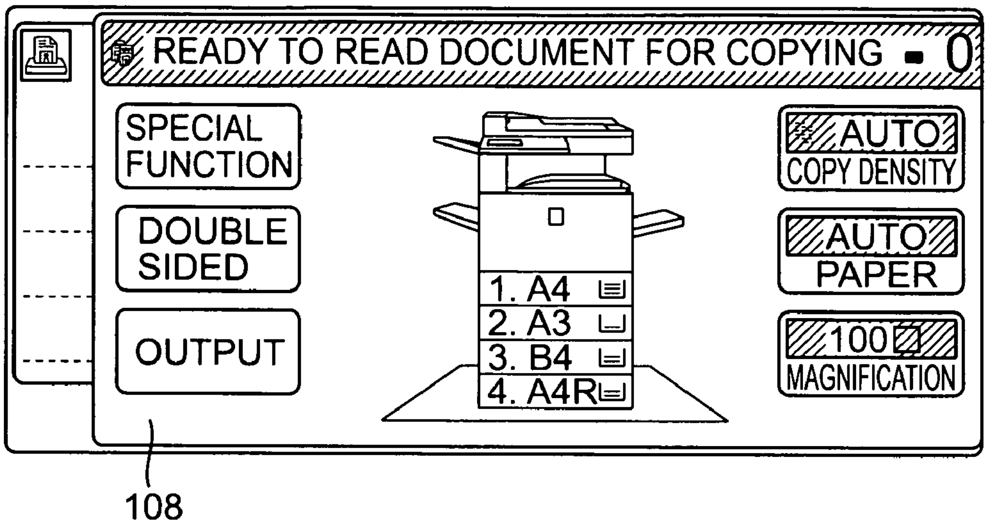
FIG. 5 shows an initial image of the image forming apparatus displayed on electronic paper.

FIG. 5 shows an initial image of image forming apparatus 20. This image allows execution of copying function. In the sleep mode, the user viewing the initial image held on electronic paper 108 can grasp the paper size and the amount of paper placed on paper cassette 80.

Figure 6:
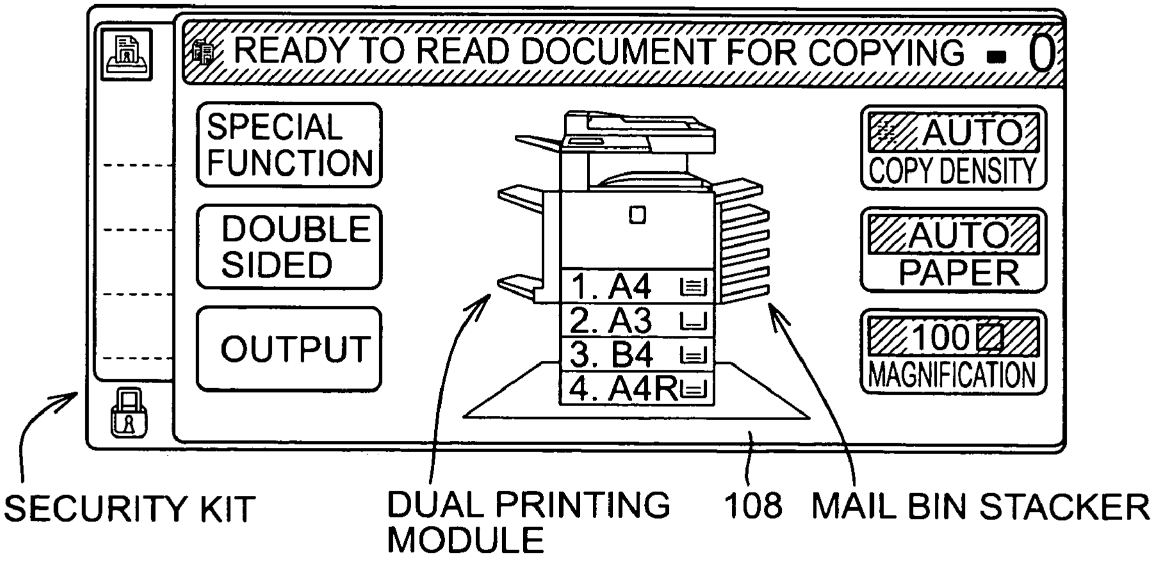
FIG. 6 shows an image having "mail bin stacker", "dual printing module" and "security kit" for data erasure, attached to the standard image forming apparatus of FIG. 5, displayed on the electronic paper.

FIG. 6 shows an image showing "mail bin stacker", "dual printing module" and "security kit" for data erasure, attached to the standard image forming apparatus 20 shown in FIG. 5. As shown in FIG. 6, this image can also be maintained on electronic paper 108 in the sleep mode.

Figure 7:
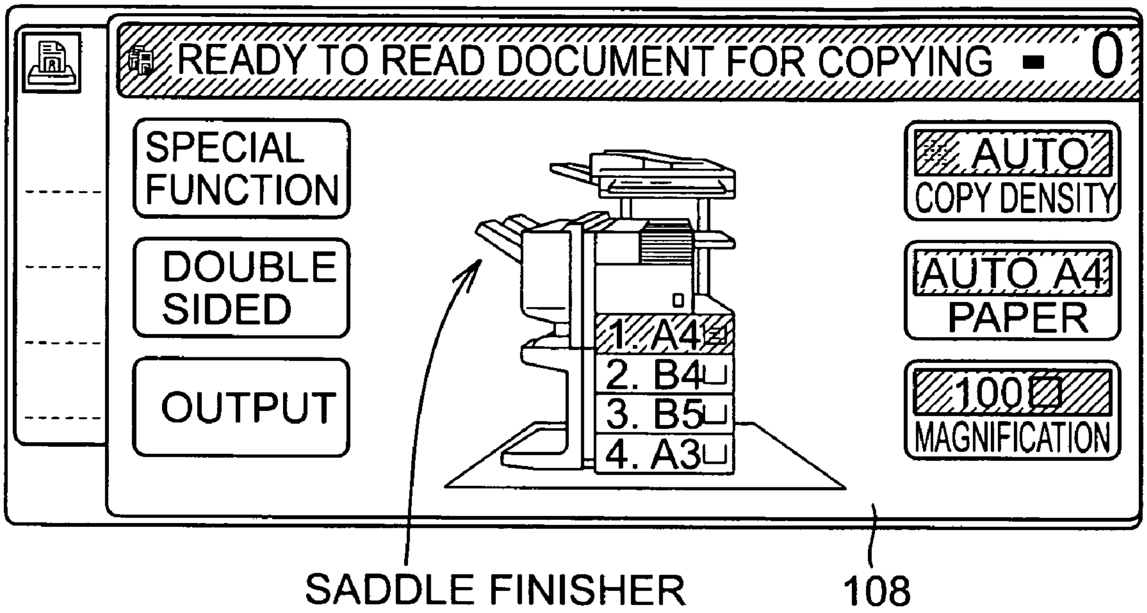
FIG. 7 shows an image having "saddle finisher" attached to the standard image forming apparatus of FIG. 5, displayed on the electronic paper.

Further, FIG. 7 shows an image showing "saddle finisher" attached to the standard image forming apparatus 20 shown in FIG. 5. As shown in FIG. 7, this image can also be maintained on electronic paper 108.

When there is a transition to the power save mode, if such a display as described above is given on electronic paper 108, it becomes possible for the user to select a desired optional device without the necessity of starting power supply.

On the display image of electronic paper 108 shown in FIGS. 5 to 7, a message "Ready to read document for copying", that the apparatus is in automatic copy density and paper selection mode, and that copy magnification is 100%, are displayed in highlight. FIG. 7 indicates, by emphasized display, that paper is contained only in the uppermost cassette. This allows the user to intuitively understand that copying on a sheet of different size is impossible. On the contrary, it may be possible to display in emphasized manner or in enlargement, only the cassette that is empty, to urge the user to replenish paper. If the user opens the cassette and replenishes paper in the sleep mode, transition from the sleep mode to operation mode may be made, to update the display of paper stock status in the cassette. In this manner, the display can constantly be updated to indicate the latest state. Not only the status of paper stock in the cassettes but also toner level may be displayed, to urge the user to replenish toner.

Figure 8:
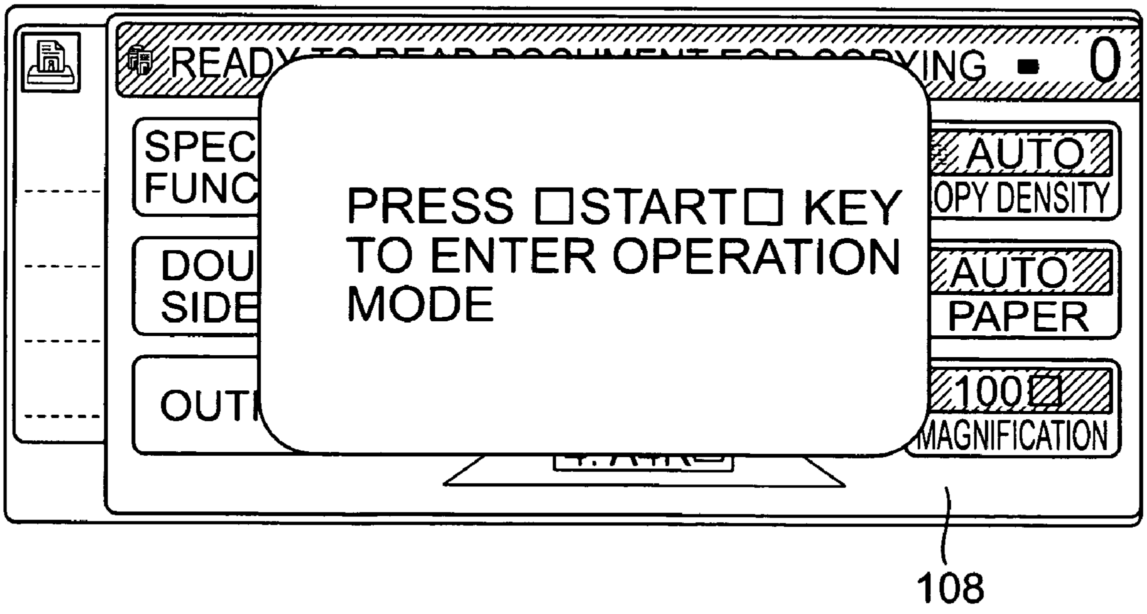
FIG. 8 shows an image representing transition procedure from sleep mode to normal operation mode, displayed on the electronic paper.

Further, on the display image of electronic paper 108 shown in FIGS. 5 to 7, a message representing transition procedure from sleep mode to normal mode, such as "Press 'Start' key to enter operation mode" may be displayed in large size and overlapped manner as shown in FIG. 8.

Figure 9:
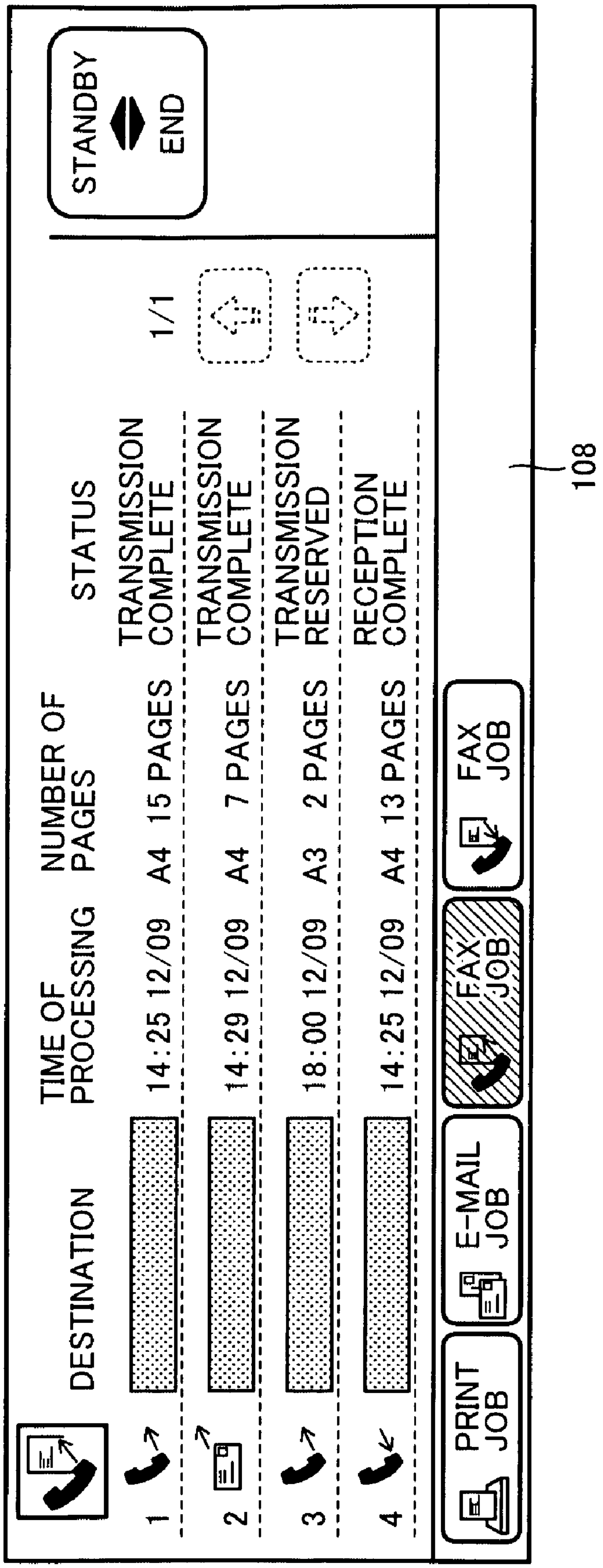
FIG. 9 shows an image representing a job transmission status, displayed on the electronic paper.

FIG. 9 shows an image representing job transmission status. Even when image forming apparatus 20 is in the power saving mode and the power is limited, communication function is operable and, therefore, it is possible to reserve transmission and receive facsimile (FAX) at night. On electronic paper 108, set reservation status, for example, is displayed. It is possible for the user to confirm the status of reserved job, without necessitating power supply.

On the display image of electronic paper 108 shown in FIG. 9 also, a mark representing the manner of latest communication job is highlighted.

<Functions and Effects>

The present embodiment attains, among others, the following functions and effects.

(1) After the transition to sleep mode, guidance information is displayed on electronic paper 108. Specifically, electronic paper 108 maintains the displayed contents even when power is not supplied and, therefore even when power is not supplied to display panel 122 in the sleep mode, it can continue display for the user. Accordingly, the method of transition from sleep mode to operation mode, reservation status of transmission job, status of confidential data storage, and information related to image formation including remaining amount of toner and paper may be displayed as guidance information to support the user. Further, even if image forming apparatus 20 does not make a transition to the operation mode, it is possible for the user to grasp the state of image forming apparatus 20 and, as the method of transition from sleep mode to operation mode can be notified to the user, better function as a user interface can be attained without wasting power. As a result, image forming apparatus 20 that can support user in the sleep mode can be provided.

(2) Electronic paper 108 can maintain displayed contents even when power is not supplied and, therefore, display for the user can be continuously given to the user even if operation of image forming apparatus 20 is suspended. Therefore, a message necessary for the user can be given to the user without wasting power.

(3) The guidance information displayed on electronic paper 108 serves as an initial image such as the image for copying operation. As the initial image is displayed in this manner, it is possible to determine the remaining amount of paper, toner replenishment level, and status of attachment of any optional device that cannot be determined from appearance, such as the finisher and LCC. Therefore, the user can determine whether or not a desired copying operation is possible, without necessitating transition to the operation mode. As a result, better function as a user interface can be attained, and wasteful power consumption can be reduced.

(4) The guidance information displayed on electronic paper 108 includes display information representing transition procedure from sleep mode to operation mode. As the transition procedure to the operation mode is displayed, a user not familiar with the procedure can be well supported.

(5) The guidance information displayed on electronic paper 108 includes reservation information of transmission data. Therefore, it is possible to confirm reservation status of transmission data without necessitating transition to the operation mode. As a result, better function as a user interface can be attained, and wasteful power consumption can be reduced.

(6) The guidance information displayed on electronic paper 108 includes storage information of received data. Therefore, it is possible to confirm the reception status of confidential data without necessitating transition to the operation mode. As a result, better function as a user interface can be attained, and wasteful power consumption can be reduced.

(7) As to the manner of display, electronic paper 108 provides highlighted display of displayed contents that well appeals to the user. Therefore, it is possible for the user to understand, by simply taking one look at the contents displayed on electronic paper 108, which state the image forming apparatus 20 is in.

The present invention is not limited to the embodiment described above.

Figure 10:
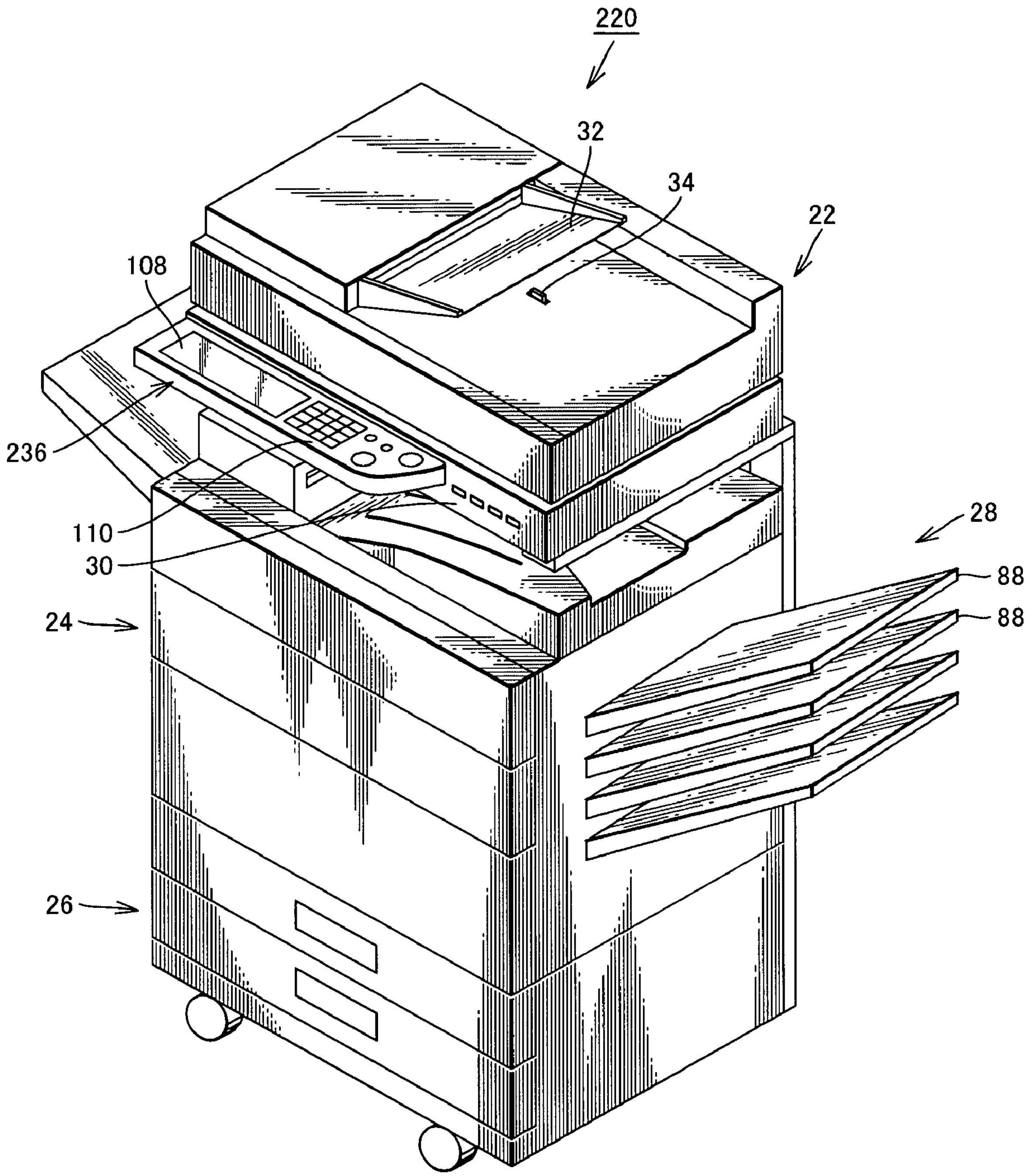
FIG. 10 is a perspective view showing an appearance of the image forming apparatus in accordance with a first modification of the present invention.
Figure 11:
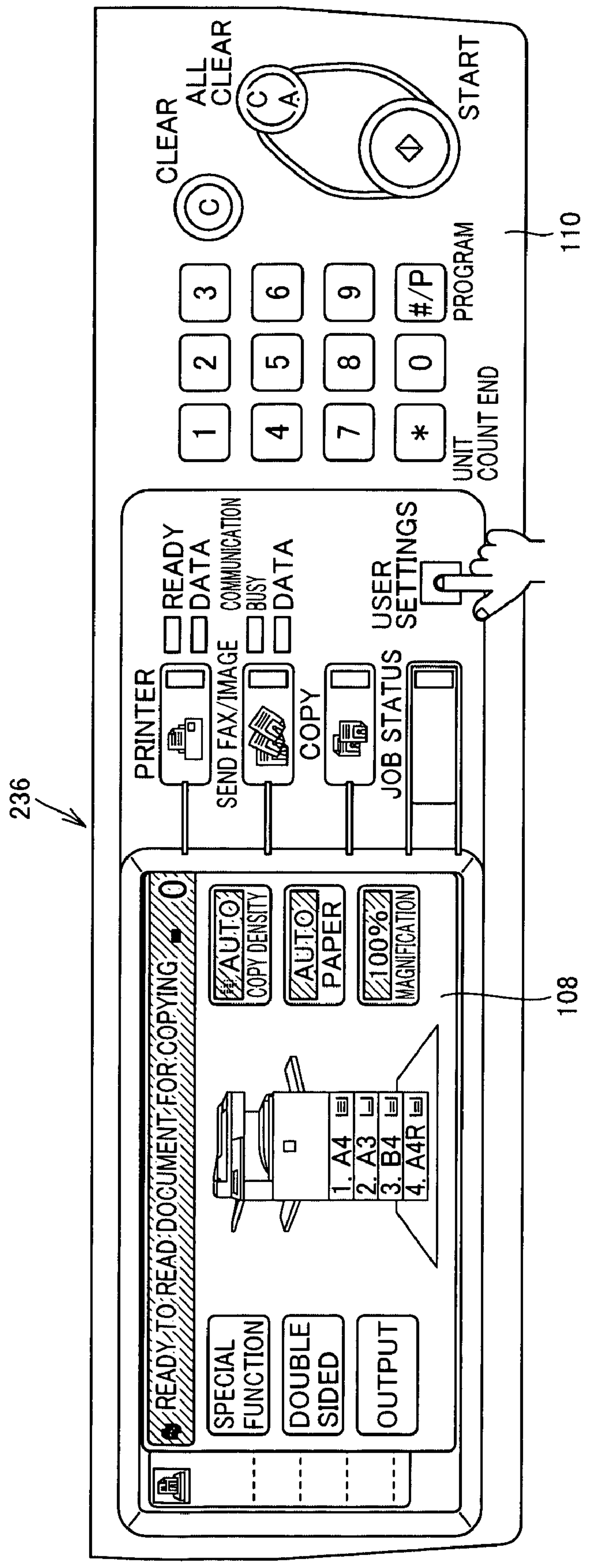
FIG. 11 is a plan view showing an appearance of an operating unit applied to the first modification.

In the embodiment above, an example has been described in which display panel 112 and electronic paper 108 are provided independent from each other. The present invention, however, is not limited to such a configuration. As shown in image forming apparatus 220 in FIG. 10 and FIG. 11, in place of operating unit 36 with display panel 112 in FIG. 1, operating unit 236 with electronic paper 108 may be provided, and electronic paper 108 may operate also as a display panel 112 of operating unit 36. By this arrangement, display during the time of power conduction and during the time of non-power-conduction becomes possible without increasing cost of the apparatus, and it is unnecessary for the user to see a plurality of displays. Therefore, interface with the user is not degraded.

Further, display of guidance information on electronic paper 108 may be continued even after power conduction is resumed. By such an arrangement, it becomes possible to support the user using guidance information continuously displayed on electronic paper 108 when power conduction is resumed.

Figure 12:
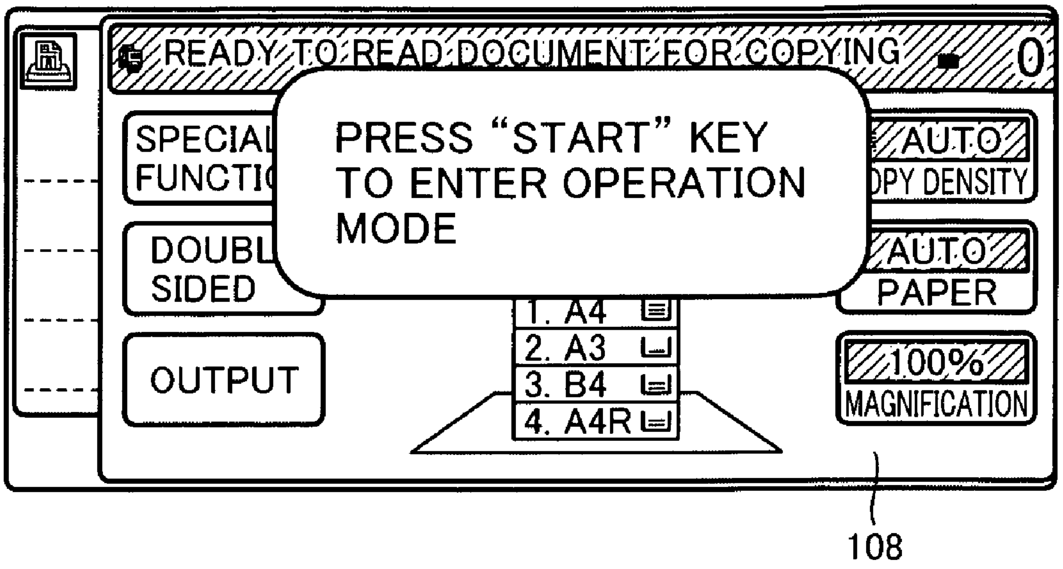
FIG. 12 shows an image in which a method of returning operation is displayed small on the electronic paper, so that paper amount in each cassette is viewable, in the image forming apparatus in accordance with a second modification of the present invention.
Figure 13:
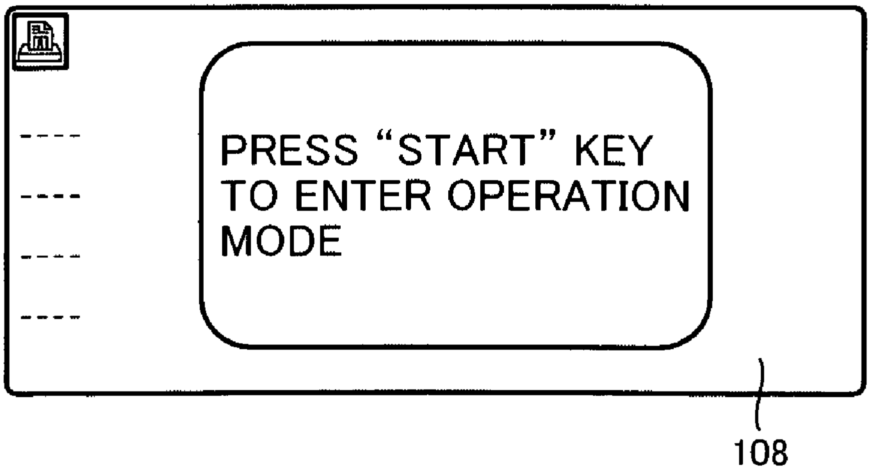
FIG. 13 shows an image in which only the transition procedure is displayed, with other displays eliminated, on the electronic paper, in the image forming apparatus in accordance with a third modification of the present invention.

In the embodiment above, an example has been described in which a message representing the transition procedure from sleep mode to operation mode, such as "Press 'Start' key to enter operation mode" is displayed in large size and overlapped manner as shown in FIG. 8. The present invention, however, is not limited to such a configuration. As a manner of display, the method of returning operation may be displayed in smaller size as shown in FIG. 12, so that paper stock in the cassette is viewable. This allows the user to grasp the size and amount of paper contained in paper cassette 80, and to grasp the transition procedure to the normal operation mode. Further, it is also possible to eliminate other displays and to display only the transition procedure, as shown in FIG. 13.

Figure 14:
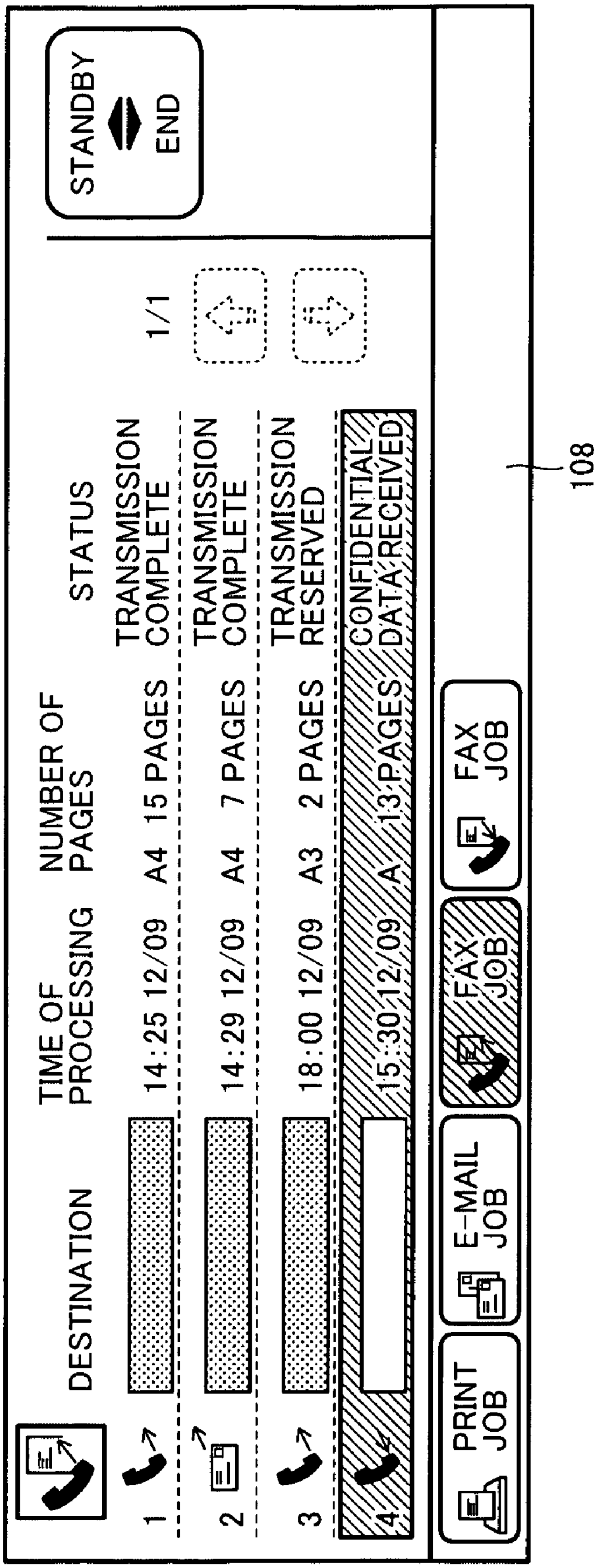
FIG. 14 shows an image in which important information such as reception of confidential data is displayed in an emphasized manner on the electronic paper, in addition to a mark indicating latest communication job, in the image forming apparatus in accordance with a fourth modification of the present invention.

Further, in the embodiment above, an example has been described in which a mark representing the manner of latest communication job is highlighted also on the display image displayed on electronic paper 108, as shown in FIG. 9. The present invention, however, is not limited to such a configuration. Highlight display may be used not only for the mark indicating the latest communication job but also for indicating important item such as reception of confidential data, as shown in FIG. 14.

Various other design changes and modifications may be made within the scope of claims as appended to the present specification.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus capable of making a transition to a sleep mode in which power consumption is limited, comprising:

a first display unit displaying a state of the apparatus during the time of power conduction;

a second display unit maintaining displayed contents during the time of non-power-conduction; and a first control circuit causing guidance information to be displayed on said second display unit, when there is a transition to said sleep mode;

wherein, said first control circuit causes said second display unit to display a standard screen of the apparatus related to image formation, as said guidance information.

2. The image forming apparatus according to claim 1, wherein said second display unit is a non-volatile display device.

3. The image forming apparatus according to claim 1, wherein said second display unit also serves as said first display unit.

4. The image forming apparatus according to claim 1, wherein said first control circuit causes said second display unit to display, as said guidance information, information representing transition procedure from said sleep mode to an operation mode.

5. The image forming apparatus according to claim 1, wherein said first control circuit causes said second display unit to display, as said guidance information, reservation information of transmission data.

6. The image forming apparatus of claim 1, wherein said first control circuit causes said second display unit to display, as said guidance information, storage information of received data.

7. The image forming apparatus according to claim 1, further comprising a second control circuit causing said second display unit to display said displayed contents in enhanced manner to better appeal to the user.

8. The image forming apparatus according to any one of claims 1 to 7, further comprising a third control circuit causing said second display unit to continue display of said guidance information even after power consumption is resumed.

* * * * *